United States Patent
Hadj-Chikh et al.

[11] Patent Number: 6,030,012
[45] Date of Patent: Feb. 29, 2000

[54] KITCHEN TOOL WITH MOVEABLE REST

[75] Inventors: Sharon Hadj-Chikh; Drew Kelley, both of Buffalo, N.Y.

[73] Assignee: Robinson Knife Manufacturing Co., Inc., Buffalo, N.Y.

[21] Appl. No.: 09/044,645

[22] Filed: Mar. 19, 1998

[51] Int. Cl.[7] .................................................. A47J 43/28
[52] U.S. Cl. ................................................. 294/7; 30/327
[58] Field of Search ............................. 294/7, 8, 9, 27.1, 294/49, 58, 59, 1.1; 30/296.1, 298.4, 323, 327; 248/37.3; D7/688–692

[56] References Cited

U.S. PATENT DOCUMENTS

| | | | |
|---|---|---|---|
| 148,355 | 3/1874 | Dennett | 30/327 X |
| D. 196,133 | 8/1963 | Brown | 30/327 X |
| 397,885 | 2/1889 | Abbe | 30/327 |
| 1,300,008 | 4/1919 | Plasclascovitie | 30/327 X |
| 1,836,014 | 12/1931 | Chamberlain | 30/327 |
| 2,789,349 | 4/1957 | Lee | 30/327 X |

FOREIGN PATENT DOCUMENTS

| | | | |
|---|---|---|---|
| 1255211 | 1/1961 | France | 30/327 |
| 2803760 | 11/1978 | Germany | 30/327 |
| 370541 | 8/1963 | Switzerland | 30/327 |
| 438474 | 11/1935 | United Kingdom | 30/327 |
| 673040 | 5/1952 | United Kingdom | 30/323 |

*Primary Examiner*—Johnny D. Cherry
*Attorney, Agent, or Firm*—Hedman, Gibson & Costigan, P.C.

[57] ABSTRACT

A kitchen tool having a work end, a handle formed of two parallel bars extending from the work end and a sliding rest on the handle. The sliding rest has two securing members that fit around the outer surface of the parallel bars of the handle wherein the securing members allow the rest to be secured to the handle in slidable relation.

9 Claims, 3 Drawing Sheets

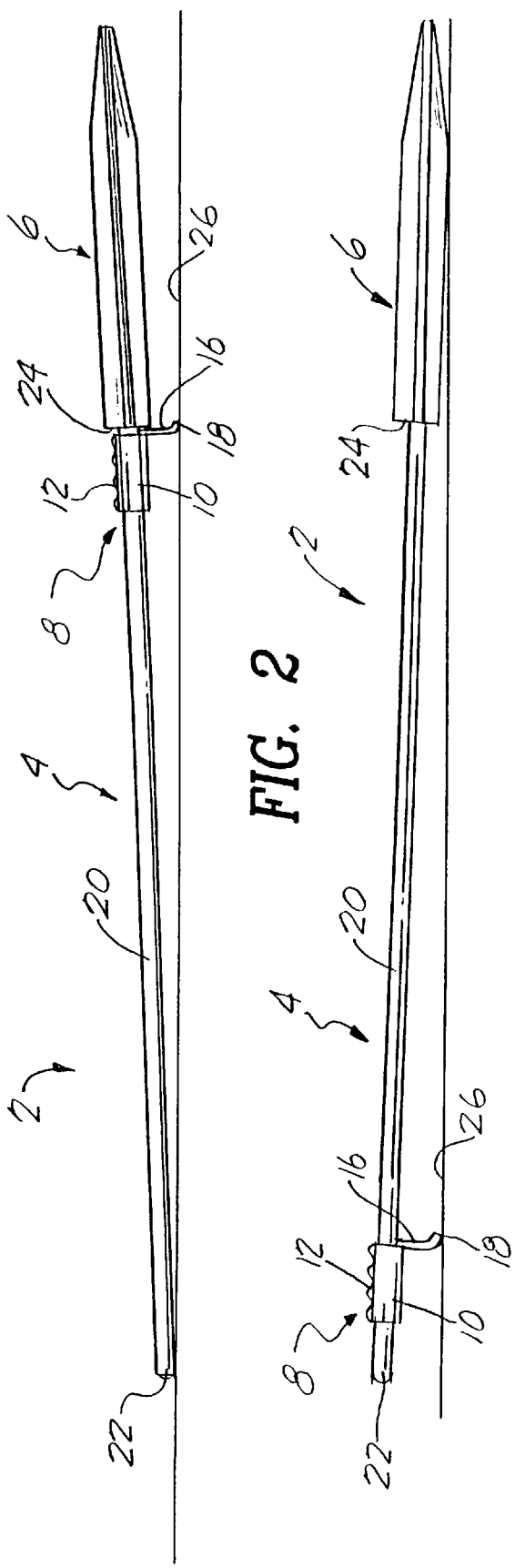

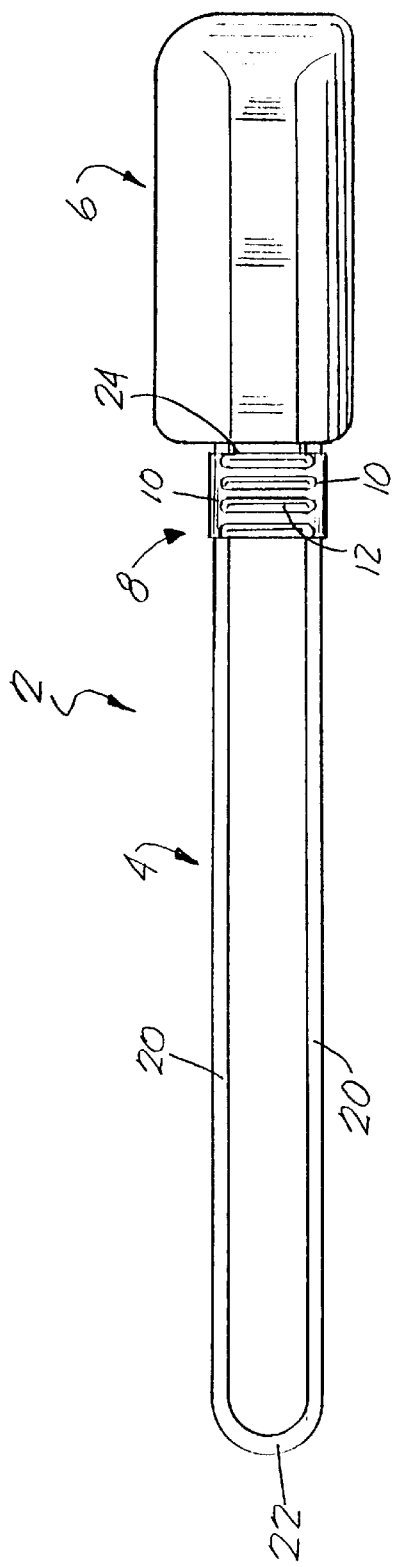
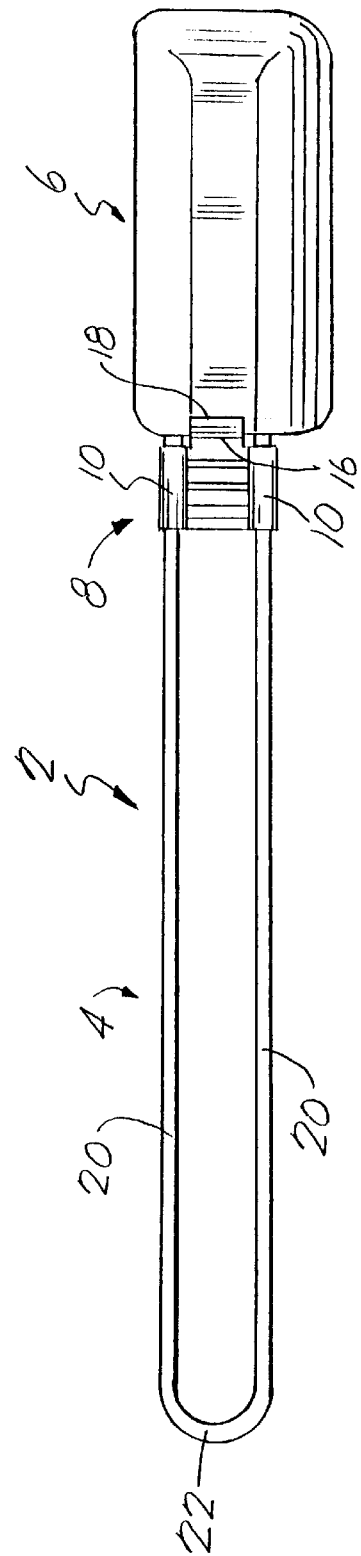
FIG. 6
FIG. 7

KITCHEN TOOL WITH MOVEABLE REST

FIELD OF THE INVENTION

This invention relates to kitchen tools in general, and in particular to kitchen tools that have been provided with means to facilitate rest in various orientations.

BACKGROUND OF THE INVENTION

Kitchen tools relate generally to turners, spatulas, spoons, cake-cutters, forks, ladles and those other utensils that are used in the kitchen for the various functions dealing with the handling and preparation of food.

Typically, kitchen tools have handles and work ends. The handles are provided for gripping the kitchen tool by the cook or chef and the work end to provide the necessary function in handling the food being prepared.

It often occurs that the work end, after performing a function becomes coated with the food being handled. Typically, the food being handled by the work end of the kitchen tool will adhere to some extent to the work end during the preparation and cooking procedure. As a result, rests have been provided to set the kitchen tool on the rest surface to avoid soiling or transferring the adhered material from the work end to a work surface or counter. These rests are typically items separate from the kitchen tool and they themselves must later be cleaned.

BRIEF DESCRIPTION OF THE INVENTION

The kitchen tool of the present invention is in essence a specially constructed handle for kitchen tools that enables each tool to rest with the work end of the kitchen tool in an elevated position when the work end has various food or other matter adhered to it that should not be transferred to a counter or other work surface. The handle is also configured to afford elevation of the terminal end of the handle when the work end is clean thereby facilitating easy gripping of the kitchen tool handle prior to using the kitchen tool in the preparation and processing of food, or to attach to the side of a bowl or pan to prevent the kitchen tool from sliding into the food during preparation.

Structurally the handle of the present invention is comprised of two parallel bars on which a moveable rest is mounted. The bars are cylindrically shaped to facilitate sliding movement of the rest between a position at the handle end and the point of securement of the handle to the work end. The rest is provided with cylindrical attachment means that travel the length of the handle and an integrally formed depending leg terminating in a rest surface intended for rest on the counter or work surface.

It is an object of the present invention to provide a kitchen tool having the capacity to rest on a surface with either the work end or handle terminal end elevated and also to provide a means of securing the kitchen tool to the edge of the bowl or pan to prevent the tool from sliding into the food. When the work end is elevated, contact of the work end with the counter or work surface is avoided. When the handle is elevated to facilitate gripping of the handle the clean work end bears against the counter or work surface.

BRIEF DESCRIPTION OF THE DRAWINGS

The invention will be better understood by way of illustration and explanation with reference to the accompanying drawings in which:

FIG. 2 is a side elevational view of a kitchen tool having the handle of the subject invention arranged to elevate the work end from a rest surface.

FIG. 3 is the same side elevational view as in FIG. 2, but with the rest in a location to elevate the handle rather than the work end.

FIG. 4 is a front elevational view of the kitchen tool shown in FIG. 2.

FIG. 5 is a rear elevational view of the kitchen tool shown in FIG. 2.

FIG. 6 is a top plan view of the kitchen tool shown in FIG. 1.

FIG. 7 is a bottom plan view of the kitchen tool shown in FIG. 1.

DESCRIPTION OF THE PREFERRED EMBODIMENT

Figures 1, 8:
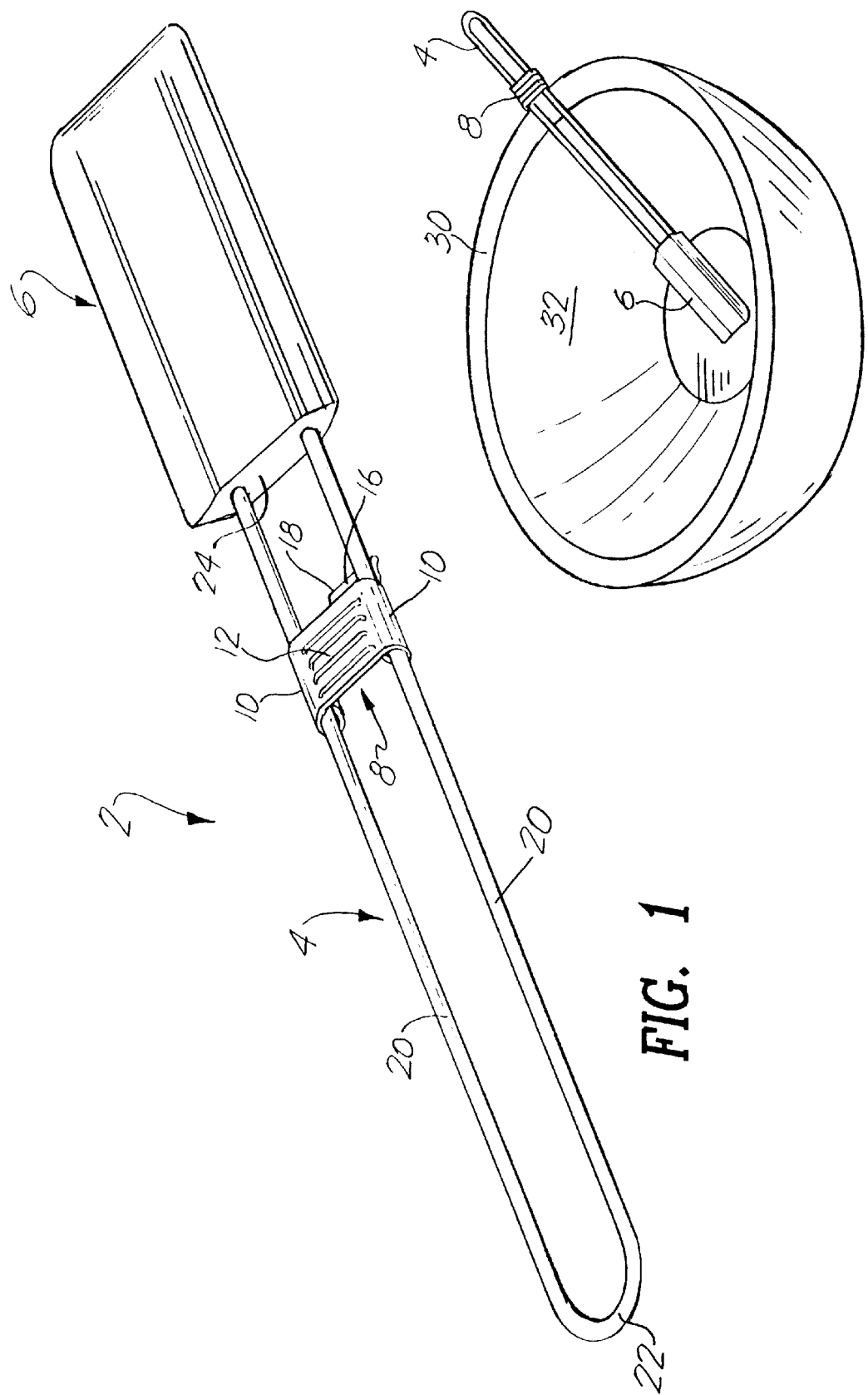
FIG. 1 is a perspective view of a kitchen tool with the handle of the present invention.
FIG. 8 is a perspective view showing the kitchen tool hooked to the rim of a bowl.

The kitchen tool of the present invention is illustrated as a spatula having the handle of the subject invention. However, the handle of the subject invention can be applied to the full spectrum of kitchen tools such as turners, spoons, forks, ladles and just about any other kitchen utensil.

As best seen in FIGS. 1–3, the kitchen tool (2) is provided with a handle (4) and a work end (6).

The handle (4) which is the basic invention of the subject kitchen tool is provided in the preferred embodiment with a sliding rest (8). In the preferred embodiment the handle (4) seen in FIGS. 4–7 is configured as a single bar bent to provide a structure of two parallel handle bars (20) and a semi-circular handle end (22) formed as a result of bending the bar to provide the parallel handle bar configuration.

The sliding rest (8) in the preferred embodiment is formed of a metal sliding member having two attachment sections (10) cylindrically configured to slidably surround each handle bar (20). The sliding rest (8) includes a connecting member (12) that extends from one attachment sliding member (10) to the other sliding member (10) and is provided with an integrally formed depending rest member (16) that terminates in a rest end (18) adapted to bear against a counter surface to provide elevation of either the handle (4) or the work end (6) or attach to a rim.

In the preferred embodiment the handle (4) is formed of a bar steel member that is secured to the work end (6) at the end (24) opposite the handle end (22). The sliding rest (8) is configured of a thin sheet of metal in a single piece. It should be noted that any other suitable material such as plastic can serve as the handle (4) and sliding rest (8). It is also noted that in the preferred embodiment the single bar member bent to provide parallel handle bars (20) and a curved handle end (22) also provides the feature of a design in which the sliding rest (8) can be urged against the curved end (22) with sufficient force to provide a weak force fit thereby maintaining the sliding rest (8) in a position to elevate the handle (4) that will not experience inadvertent dislocation of the sliding rest (8).

The handle (4) of the present invention must be sufficiently dimensioned to provide enough weight to elevate the work end (6) when the sliding rest (8) is moved to bear against the work end (6) as shown in FIG. 2. The weight of the handle (4) must be greater at the center of gravity of the handle (4) measured from the attachment end (24) to the handle end (22) than the weight of the work end (6) at the center of gravity of the work end (6). As seen in FIG. 2, the rest end (18) bears against a surface (26) such as a kitchen counter to act as a fulcrum about which the respective forces resulting from the mass of the handle (4) and work end (6) act. In the position shown in FIG. 2 with the sliding rest (8) bearing against the work end (6), the weight of the handle acting through the center of gravity of the handle (4) must be greater than the weight of the work end (6) acting through the center of gravity of the work end (6).

As seen in FIG. 3 the sliding rest (8) is at the extreme allowable position bearing against the curved handle end (22) illustrating one orientation in which the handle (4) is elevated to afford ease in gripping the handle (4). The sliding rest (8) can be moved to many locations on the handle (4) other than the location shown in FIG. 3 and still elevate the handle (4) for ease of gripping.

As can be projected from FIGS. 2 and 3 the rest end (18) of the depending rest member (16) will be below the lower surface of the handle (4) and work end (6) when the kitchen tool is in the horizontal orientation.

The sliding rest (8) provided with the depending rest member (16) extending normal to the handle (4) facilitates use as a means for attaching to a rim (30) of a conventional mixing bowl (32) as seen in FIG. 8.

I claim:

1. A kitchen tool comprising a work end, a handle extending from the work end and a sliding rest on the handle, said handle comprising two parallel bars, wherein the sliding rest comprises two securing members that secure the sliding rest into slidable relation to the handle and in which the two securing members fit around the outer surface of the two parallel bars of the handle and allow the sliding rest to move along at least a portion of the handle.

2. A kitchen tool as in claim 1 wherein the securing members of the sliding rest are provided with an inner diameter having substantially the same cross-sectional configuration as the cross-section of the two parallel bars of the handle.

3. A kitchen tool as in claim 2, further comprising a handle formed of a single cylindrical bar member bent to provide said two parallel bars of the handle and a curved handle end and wherein the sliding rest is formed of a unitary material having securing members with an inner diameter configured to substantially the same configuration as the cylindrical cross-section of the cylindrical bar member, said sliding rest further comprising a depending rest member terminating in a rest end.

4. A kitchen tool as in claim 3 wherein the slidable rest can travel from the end of the handle to any location between the end of the handle and a point of connection of the handle to the work end.

5. A kitchen tool as in claim 4 wherein the weight of the handle through the center of gravity of the handle as measured from the point of connection of the handle to the work end to the end of the handle is greater than the weight of the work end through the center of gravity of the work end.

6. A kitchen tool as in claim 3 where the rest end extends downwardly below the handle and work end when the kitchen tool is oriented horizontally.

7. A kitchen tool as in claim 6 wherein the work end is elevated when the sliding rest is against the work end and wherein the handle is elevated when the sliding rest is at the end of the handle.

8. A kitchen tool as in claim 1 comprising a depending member extending from the sliding rest to enable the kitchen tool to be secured to the rim of a bowl.

9. A kitchen tool as in claim 8 wherein the depending member extends normal to the handle.

* * * * *